W. H. STOCKHAM.
SPLIT PULLEY.
APPLICATION FILED MAY 7, 1908.
976,227.
Patented Nov. 22, 1910.
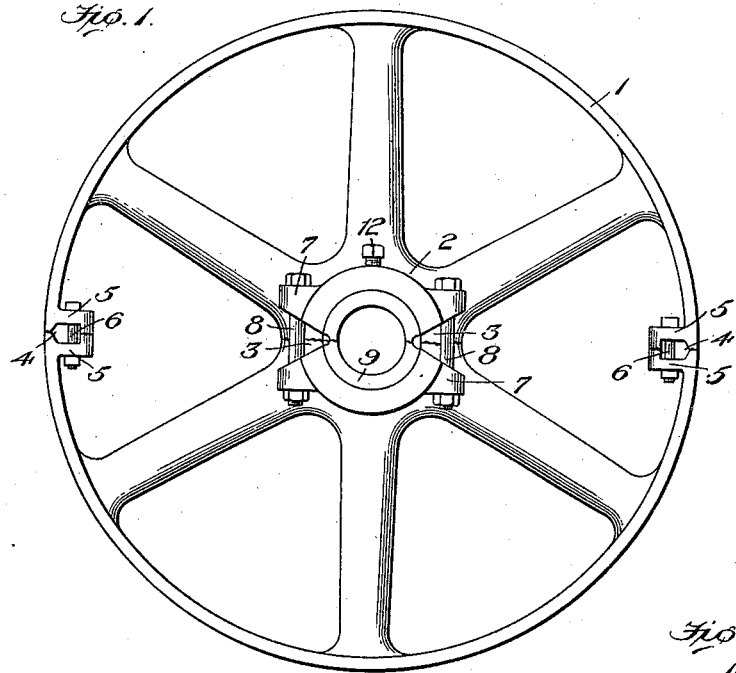
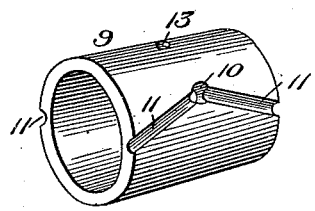 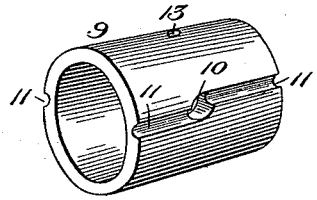 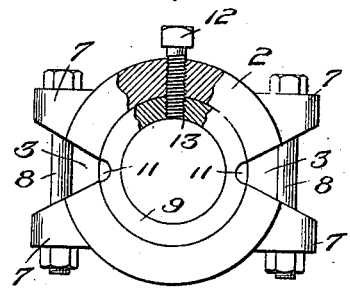
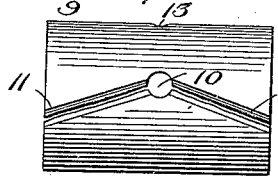 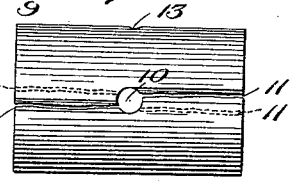 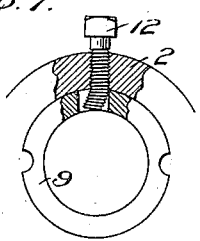
Witnesses
Edwin L. Bradford
James F. Hunter
Inventor
William H. Stockham
By
Robert Johnston Jr.
Attorney

UNITED STATES PATENT OFFICE.

WILLIAM H. STOCKHAM, OF BIRMINGHAM, ALABAMA, ASSIGNOR TO SCHAEFER MANUFACTURING COMPANY, OF BIRMINGHAM, ALABAMA, A CORPORATION OF ALABAMA.

SPLIT PULLEY.

976,227.            Specification of Letters Patent.      Patented Nov. 22, 1910.

Application filed May 7, 1908. Serial No. 431,505.

*To all whom it may concern:*

Be it known that I, WILLIAM H. STOCKHAM, a citizen of the United States, residing at Birmingham, in the county of Jefferson and State of Alabama, have invented new and useful Improvements in Split Pulleys, of which the following is a specification.

My invention relates to improvements in split pulleys which have detachable and interchangeable bushings which are also split and have bores of different diameters.

One object of my invention is to provide an improved bushing which is grooved or weakened along irregular lines so that, when split, the portions will securely interlock against lateral displacement. The line of cleavage, as thus provided, may be V-shaped or consist of two lines of fracture which are offset or out of alinement with each other. In both constructions a small opening is provided at the middle of the cleavage line to receive the tool used to split the bushing.

A further object is to provide the manner of securing the bushing in place in the pulley hub, and in this connection, it will be evident where the two sections of the bushing interlock with each other and are so held by the pulley hub, that it will be necessary to use only a single set screw to hold both parts of the bushing in place. The bushing may be turned with a plain circumference, and if the opening for the set screw therein be made slightly smaller than the screw so that it will have to force its way through, a decided improvement will be gained over constructions wherein the opening through the bushing is large enough to leave a clearance around the screw, which being thus left unsupported between the reverse strains, tends to bend diagonally across the opening and then can not be removed with ease.

These and other improvements constituting my invention are hereinafter more fully described and illustrated in the accompanying drawings, in which:—

Figure 1 is a side view of the assembled pulley after the hub rim and bushing have been broken and again joined together. Fig. 2 is a detail perspective view of one form of my improved split bushing, and Fig. 3 is a side view of the same bushing after fracture. Figs. 4 and 5 are views corresponding to Figs. 2 and 3 of a modified form of bushing. Fig. 6 is an enlarged detail end view of the pulley hub and bushing broken away to show the contracted opening in the bushing for the set screw. Fig. 7 corresponds to Fig. 6, showing the usual set screw opening in the bushing and illustrating the disadvantages of that construction.

In the drawings, I provide a split pulley having a rim 1, and a hub 2 which is suitably weakened at 3 so that the hub which has been otherwise cast integral may be broken into along these weakened portions or cleavage lines. In the same transverse plane with the cleavage lines for the hub, I provide a transverse weakened portion or cleavage line 4 extending across the rim and flanged on each side by a pair of inwardly projecting lugs 5 which are at their outer edges cast integral and adapted to be broken apart and then fastened together by bolts 6. The hub is cast with bolting lugs 7, through which pass bolts 8 which connect the halves of the pulley hub together after the same have been split apart. The pulley may be split in any suitable manner as now in practice.

To adapt pulleys of this type to fit shafts of varying diameters, each pulley of a given size is provided with detachable and interchangeable bushings, as 9, which have the same diameter over all but varying internal diameters. The bushings are turned up slightly larger than the bore of the pulley hub but are reduced in circumference to properly fit said bore by filing down the edges along the line of fracture of the bushing when split as hereinafter described. These bushings are turned up with a practical smooth exterior and have no lugs or offsets which would increase their cost of manufacture. Near the middle of the bushing I bore or drill a small opening 10 to receive the splitting tool, as it will be necessary to split these bushings to enable them to be assembled around the shaft. From the opening 10 I cut or otherwise provide grooves or weakened cleavage lines 11 which, for the purpose of enabling the two bushing sections to interlock with each other against lateral displacement when clamped around the shaft by the pulley hub, are arranged out of alinement.

In my preferred construction these lines are disposed at angles meeting at the opening 10, or an equally effective construction is secured as seen in Fig. 4, where the cleavage line leading from the rim of the pulley into the opening 10 is disposed parallel with but out of alinement with the other cleavage line leading from the opening to the other rim. In this construction when the bushings have been split, each will be provided with a shoulder on one side of the opening 10 which is offset from the other side. In my preferred construction the sections of the bushing will have V-shaped fractures, but in both cases the sections of the bushing will effectively interlock with each other after they have been filed down to the desired extent, and have been clamped in place in the hub. To secure the bushing in place in the pulley hub, I provide a set screw 12 which passes through a threaded opening in one of the hub sections and is adapted to be forced through a smooth opening 13 provided in one of the bushing sections. By making this opening of slightly smaller diameter than the threads of the set screw, the latter will have to force its way through to reach the shaft, and in doing this will become practically solid with the bushing. This construction I have found to be greatly advantageous over constructions wherein a large opening is left for the set screw, for in such constructions the screw is likely to act as may be seen in Fig. 7. On the other hand the threading of the opening in the bushing would increase its cost unnecessarily.

To effectively lock the sections of the bushing shown in Figs. 4 and 5 against relative lateral displacement in either direction, I arrange the grooves 11 on opposite sides of the bushing in such manner that a reverse lock is provided on the rear side from the shoulder lock obtained on the front side. This will be noted by the position of a dotted cleavage line in Fig. 5.

It is further to be noted that the provision of the opening and grooves in the bushing permits the oil of lubrication to flow through the openings and collect in the grooves so that the latter acts as storage chambers for excess oil which will flow back when a deficiency of oil occurs in the ordinary manner of lubricating the journal.

Having thus described my invention, what I claim as new and desire to secure by Letters Patent, is:—

1. A bushing for split pulleys comprising an integral tubiform body portion having weakening grooves formed in the outside of the body and running substantially longitudinal of said body, each groove consisting of disalined adjoining portions, said bushing further having an opening leading from the juncture of the disalined portions of each groove to the interior.

2. A bushing for split pulleys comprising an integral tubiform body portion having weakening grooves formed on V-shaped lines along the exterior of said body and running substantially longitudinal of said body, said bushing further having openings leading from the apices of the V-shaped groove lines to the interior.

3. The combination with a split pulley having a cylindrical bored hub, and means to unite the pulley sections, of a bushing for said pulley comprising an integral tubiform body portion having weakening grooves formed on the outside of the body and running substantially longitudinal of said body, each groove consisting of disalined adjoining portions, said bushing further having an opening leading from the juncture of the disalined portions of each groove to the interior.

4. The combination with a split pulley having a cylindrical bored hub, and means to unite the pulley sections, of a bushing for said pulley comprising an integral tubiform body portion having longitudinally arranged weakening grooves formed on V-shaped lines along the exterior of said body, said bushing further having openings leading from the apices of the V-shaped grooves to the interior.

In testimony whereof I have hereunto set my hand in presence of two subscribing witnesses.

WILLIAM H. STOCKHAM.

Witnesses:
A. R. FORSYTH,
NOMIE WELSH.